Patented Dec. 24, 1946

2,413,049

UNITED STATES PATENT OFFICE 2,413,049

METHYL SILICON HALIDES AND THEIR PRODUCTION

James Franklin Hyde, Corning, N. Y., assignor to Corning Glass Works, Corning, N. Y., a corporation of New York No Drawing. Application July 3, 1942, Serial No. 449,669

7 Claims. (Cl. 260—607)

This invention relates to new compositions of matter and their preparation, and more particularly to methyl silicon halides.

This application is a continuation in part of my copending application, Serial Number 353,302, filed August 19, 1940.

One of the objects of my invention is the preparation and isolation of methyl silicon halides having the general formula $(CH_3)_nSiX_{4-n}$, where $n$ may be 1, 2, or 3 and X is any halogen atom.

Another object of my invention is the preparation and isolation of dimethyl silicon dichloride.

Another object of my invention is the preparation and isolation of monomethyl silicon trichloride.

In accordance with my invention I have found that the methyl silicon chlorides may be prepared by reacting methyl magnesium halide slowly with silicon tetrachloride in ether solution, separating the precipitating magnesium salts, and thereafter repeatedly fractionally distilling the liquid portion of the reaction mixture to recover the respective methyl silicon chlorides.

The method employed in preparing these methyl substituted silicon chlorides is in detail as follows: The methyl magnesium halide, preferably the chloride, is prepared by bubbling methyl chloride gas through ether in the presence of magnesium under anhydrous conditions until all the magnesium has reacted. The resulting methyl magnesium chloride is then siphoned into a flask which contains silicon tetrachloride preferably dissolved in an ether such as ethyl or butyl ether. The presence of the solvent ether aids in controlling the reaction, since it serves as a diluent. The ratio of molar concentrations of the methyl magnesium chloride and the silicon tetrachloride depends on whether a greater yield of the dimethyl silicon chloride is desired or whether a greater yield of the monomethyl silicon chloride is desired. If dimethyl silicon chloride is primarily desired, the preferable ratio of the methyl magnesium chloride to the silicon tetrachloride is approximately 2 to 1. If the monomethyl silicon trichloride is desired, the ratio is preferably 1 to 1. However, in both cases a mixture of all the methyl substituted chlorides is obtained. The methyl magnesium chloride is added slowly to the silicon tetrachloride solution, since a certain amount of heat of reaction is developed with a resulting increase in temperature of the reaction mixture. If desired, the flask may be cooled as by running cold water thereover or the like, or a reflux condenser may be attached to insure that none of the volatile reactants or products escape. However, if the methyl magnesium chloride is added sufficiently slowly over a long period of time the rise in temperature may be easily restrained. The reaction mixture should be stirred during the addition of the methyl magnesium chloride and also for a short time thereafter. The reaction is carried out under anhydrous conditions preferably by means of the use of calcium chloride, or alumina at points where the reaction mixture is exposed to the air. As a result of this reaction, a mixture of the methyl substituted chlorides is produced in ether solution with the monomethyl and dimethyl substituted compounds predominating.

The isolation of monomethyl silicon trichloride and of dimethyl silicon dichloride is accomplished in the following manner: The supernatant liquid in the reaction mixture obtained above is separated from the magnesium salts by conducting it through a filter under pressure from the reaction flask into a distilling flask. The ether is distilled off. The remaining liquid is then fractionally distilled through a column having a high reflux ratio and fractionating efficiency. The column actually used was about three feet in length and was packed for a distance of about sixty centimeters with glass helices. This column was also jacketed and heated in the well-known manner. The liquid residue was fractionally distilled through this column with the bulk of the liquid distilling over between 66° C. and 72° C. Repeated fractional distillation of this liquid boiling between 66° C. and 72° C. separated it into two fractions, one boiling in the vicinity of 67.5° C. and the other boiling between 70° C. and 71° C. Chemical analysis of these two fractions showed that the fraction boiling at 67.5° C. was the monomethyl silicon trichloride; while the fraction boiling between 70° C. and 71° C. was dimethyl silicon dichloride. The atmospheric pressure during the fractional distillation varied between 740 mm. to 745 mm.

The monomethyl silicon trichloride and the dimethyl silicon dichloride prepared and isolated in the manner above described were found exceedingly useful as intermediates in the preparation of methyl silicones as disclosed in my copending application Serial No. 353,302, filed August 19, 1940. As pointed out in that application, these silicones are extremely useful as surface treating materials, lubricants and so forth.

I claim:

1. The method of preparing methylsilicon chlorides which comprises reacting a methyl magnesium halide with silicon tetrachloride in a mutual solvent and fractionally distilling the liquid reaction product to recover methylsilicon chlorides.

2. The method of preparing methylsilicon chlorides which comprises reacting a methyl magnesium halide with silicon tetrachloride in a mutual solvent and fractionally distilling the liquid reaction product to recover methylsilicon trichloride.

3. The method of preparing methylsilicon chlorides which comprises reacting a methyl magnesium halide with silicon tetrachloride in a mutual solvent and fractionally distilling the liquid reaction product to recover dimethylsilicon dichloride.

4. A composition of matter comprising a mixture of methylsilicon chlorides.

5. A composition of matter comprising a compound having the formula $(CH_3)_n SiCl_{4-n}$ where $n$ represents an integer from 1 to 2.

6. Methylsilicon trichloride.

7. Dimethylsilicon dichloride.

JAMES FRANKLIN HYDE.

DISCLAIMER 2,413,049.—*James Franklin Hyde*, Corning, N. Y. METHYL SILICON HALIDES AND THEIR PRODUCTION. Patent dated Dec. 24, 1946. Disclaimer filed Apr. 8, 1947, by the assignee, *Corning Glass Works*.

Hereby enters this disclaimer to claims 4, 5, 6, and 7 in said specification.

[*Official Gazette May 6, 1947.*]

rides which comprises reacting a methyl magnesium halide with silicon tetrachloride in a mutual solvent and fractionally distilling the liquid reaction product to recover methylsilicon chlorides.

2. The method of preparing methylsilicon chlorides which comprises reacting a methyl magnesium halide with silicon tetrachloride in a mutual solvent and fractionally distilling the liquid reaction product to recover methylsilicon trichloride.

3. The method of preparing methylsilicon chlorides which comprises reacting a methyl magnesium halide with silicon tetrachloride in a mutual solvent and fractionally distilling the liquid reaction product to recover dimethylsilicon dichloride.

4. A composition of matter comprising a mixture of methylsilicon chlorides.

5. A composition of matter comprising a compound having the formula $(CH_3)_n SiCl_{4-n}$ where $n$ represents an integer from 1 to 2.

6. Methylsilicon trichloride.

7. Dimethylsilicon dichloride.

JAMES FRANKLIN HYDE.

DISCLAIMER 2,413,049.—*James Franklin Hyde*, Corning, N. Y. METHYL SILICON HALIDES AND THEIR PRODUCTION. Patent dated Dec. 24, 1946. Disclaimer filed Apr. 8, 1947, by the assignee, *Corning Glass Works*.

Hereby enters this disclaimer to claims 4, 5, 6, and 7 in said specification.

[*Official Gazette May 6, 1947.*]